April 13, 1965   R. C. ZELLER   3,178,239
TRACK LINK WITH REVOLUBLE SLEEVE
Filed Sept. 16, 1963
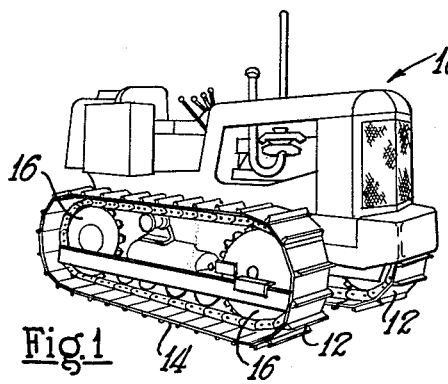
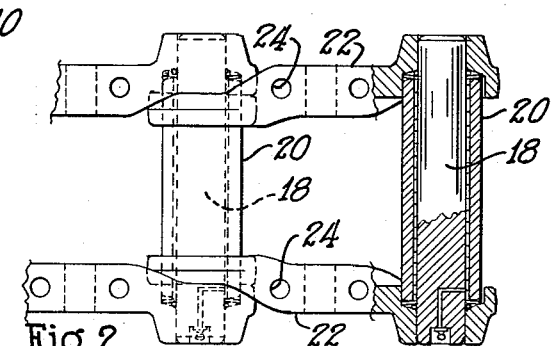
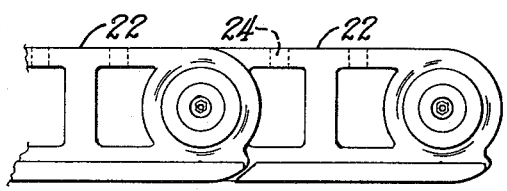
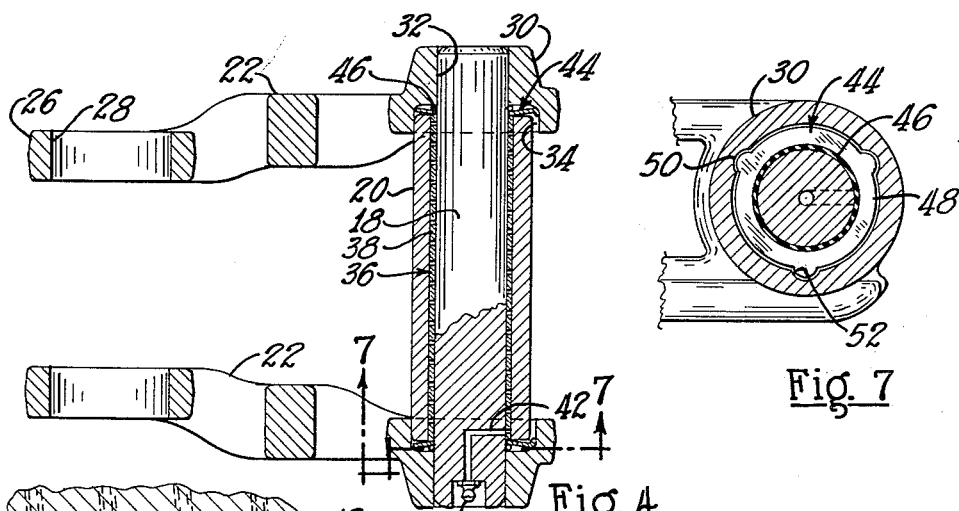
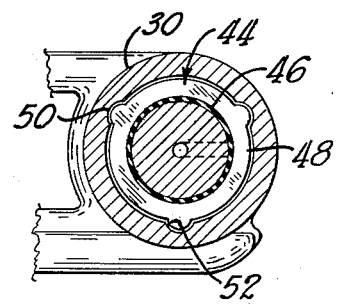
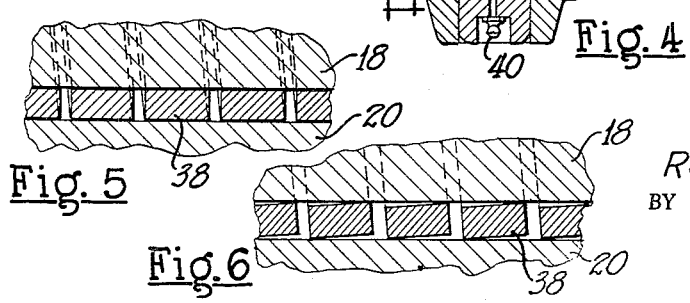
INVENTOR.
ROBERT C. ZELLER
BY
ATTORNEYS United States Patent Office 3,178,239
Patented Apr. 13, 1965

3,178,239
TRACK LINK WITH REVOLUBLE SLEEVE
Robert C. Zeller, Defiance, Ohio, assignor to Zeller Corporation, Defiance, Ohio, a corporation of Ohio
Filed Sept. 16, 1963, Ser. No. 309,039
6 Claims. (Cl. 305—11)

This invention relates to chains for crawler tractors and the like and more particularly to such chains having sleeve members around link pins thereof.

Chains for tractors of the crawler type are attached to treads of the tractor and, in turn, are engaged by drive sprockets whereby the treads can be driven. These chains normally have relatively short lives because they are subjected to heavy stresses and sudden loads and also the components move relative to one another each time they are engaged by and carried around a sprocket. The relatively short life of such chains is due in part to the fact that effective, uniform lubrication is difficult to attain between the link pins and their associated bushings and because of the constant relative movement particularly between the same portions of the link pins and the bushings during operation of the tractor. Abrasion between the components is also increased by dirt, sand, and the like which work between the components of the chains during operation.

The present invention provides an improved chain for tractors of the crawler type which chain has a longer effective life than chains heretofore known. The improvement primarily lies in the use of a sleeve member, preferably of helical configuration, between link pins and bushings of the chain. The helical sleeve member contributes to a longer life of the chain in several ways. The sleeve member is capable of rotating or oscillating relative to both the link pin and the bushing which equalizes wear between them by slowly rotating during operation. The sleeve member also reduces shock to the chain caused by sudden loads, weaving, and uneven stresses. The passage formed by the helical sleeve member also serves an important function in constituting a passage around the link pin for lubricant which thereby can be more effectively and uniformly distributed than heretofore possible. In addition, the helical member resists lateral movement of "snaking" which occurs if the tractor is operated at an angle, as on the side of a hill, for example.

It is, therefore, a principal object of the invention to provide an improved chain for a crawler type tractor, which chain has the advantages outlined above.

Other objects and advantages of the invention will be apparent from the following detailed description of a preferred embodiment thereof, reference being made to the accompanying drawing, in which:

FIG. 1 is a somewhat schematic view in perspective of a crawler tractor embodying treads and tread chains according to the invention;

FIG. 2 is a greatly enlarged plan view, with parts broken away and with parts in cross section, of a portion of one of the chains shown in FIG. 1;

FIG. 3 is a view in elevation of the portion of the chain shown in FIG. 2;

FIG. 4 is a further enlarged view in cross section of a linkage of the chain shown in FIG. 2;

FIG. 5 is a fragmentary view of a portion of the chain linkage of FIG. 4;

FIG. 6 is a view similar to FIG. 5 but showing components in slightly displaced positions; and FIG. 7 is a view in cross section taken along the line 7—7 of FIG. 4;

Referring to the drawing, and more particularly to FIG. 1, a crawler tractor indicated at 10 has two treads 12 which are independently driven to control direction of the tractor, as is well known in the art. A chain indicated at 14 is attached to each of the treads 12 and, in turn, is engaged by drive and idler sprockets 16 which drive the tractor through the chains 14 and the treads 12. The chain 14 is subjected to large stresses and sudden heavy loads and is made of hardened steel to extend the life as much as possible. Even so, because the chain is in close proximity to the ground, dirt, sand, and other abrasive materials can work into the chain components and substantially shorten the life. Chain life is also shortened because relative movement constantly occurs between the components of the chain as the chain is driven by and moves around the sprockets 16. Not only does this relative movement constantly occur, but it occurs between the same portions of the components so as to increase wear by concentrating it on relatively small portions of the overall components. The life of the chain is further shortened by the fact that it is continually subjected to sudden shock loads, weaving, and unequal stresses.

The new chain 14 according to the invention is designed to reduce the effect of the above factors and to greatly extend the life of the chain. This is principally accomplished by improving lubrication of the chain components, reducing and equalizing relative movement and wear of the components, helping to absorb sudden shock loads, and resisting lateral movement of the chain components, as will be more fully brought out in the following discussion.

Referring more particularly to FIGS. 2-4, the chain 14 includes link pins 18 around each of which is a cylindrical bushing 20 of somewhat shorter length so that the pins extend outwardly beyond the ends of the bushings 20. Chain links or side bars 22 of any suitable known design are provided in left and right hand sets with each of the links 22 having holes 24 therein to receive fasteners which attach the treads 12 to the chain 14. An inner or rear end 26 of each of the links 22 has an opening 28 therein to receive a portion of one of the bushings 20 in a press fit so that each of the links 22 is functionally integral with one of the bushings 20. An outer or front end 30 of each of the links 22 is provided with an opening 32 to receive the end of one of the link pins 18 with a press fit so that each of the links 22 is functionally integral with one of the pins 18. The outer end 30 of each of the links 22 also forms an annular recess 34 which receives an end portion of one of the bushings 20, outside of the inner end 26 of the adjacent link 22 which is press fit on the bushing. To this point, the chain described essentially is of conventional construction.

In accordance with the invention, a sleeve member 36, preferably of helical configuration, is disposed between each of the link pins 18 and the associated bushing 20. The sleeve member 36 has a plurality of coils 38 preferably of rectangular cross section, as shown in FIGS. 4-6, with the coils extending substantially from one end of the bushing to the other. The sleeve member 36 even without the coils constitutes an important contribution to the extension of the life of the chain 14. The sleeve member 36, which has a sliding fit with respect to the pin 18 and the bushing 20, can rotate or, more specifically, oscillate relative to them and thereby continually present different wear surfaces. Normally, the wear between the pin 18 and the bushing 20 occurs only on one portion thereof as the chain 14 moves around the sprockets 16. However, with the sleeve member 36 moving, this wear tends to be more fully distributed and less concentrated. The total relative movement of the components is also reduced because it is now divided into a portion between the pin 18 and the sleeve member 36 and a portion between the sleeve member 36 and the bushing 20. In addition, the coils 38 present a reduced area of contact as well as promote the oscillating movement. The sleeve thereby prolongs the period between replacements for which the chain must be completely dis-assembled and the worn pins and bushings replaced.

Wear also occurs when the ends of the bushings 20 contact the ends 30 of the links 22, which happens particularly when the chains 14 are subjected to thrust loads, as when the tractor is operated on the side of a hill, for example. The sleeve member 36, however, resists shifting of the bushing on the pin by means of the rectangular configuration of the coils 38. When shifting tends to occur, the coils 38 move from a position parallel to the bushing 20 and the pin 18, as shown in FIG. 5, to a position in which the diagonally opposite edges of the coil 38 bear against the bushing 20 and the pin 18, as shown in FIG. 6. Besides reducing wear by the expedients discussed above, the sleeve member 36 also tends to help absorb sudden loads, weaving, and unequal stresses caused by movement of the tractor over rough terrain.

The helical sleeve member 36 has an additional important function in distributing lubricant over the length of the bushing 20 and the corresponding portion of the link pin 18. For this purpose, one end of the pin 18 has a grease fitting 40 which communicates with the sleeve member 36 through an L-shaped lubricant passage 42. When lubricant is forced through the fitting 40 and the passage 42, it is pushed into the helical passage formed between the coils 38 and is subsequently distributed over the entire length of the sleeve member 36 as the member rotates relative to the pin 18 and the bushing 20. Seals 44 are provided at each end of the bushing 20 to retain the lubricant therein and to keep out abrasive material. As discussed more fully in a copending application of Zeller and Goller, Serial No. 200,809, filed June 7, 1962, now Patent No. 3,110,524, the seal 44 includes a sealing ring 46 of resilient material and a dish-shaped washer 48 (see also FIG. 7) located between the resilient ring 46 and the end of the bushing 20. The washer 48 also has ears 50 which extend into notches 52 of the end 30 of the link 22 to prevent rotation between the washer 48 and the end 30.

Various modifications of the above described embodiment of the invention will be apparent to those skilled in the art, and it is to be understood that such modifications can be made without departing from the scope of the invention, if they are within the spirit and the tenor of the accompanying claims.

What I claim is:

1. A chain for the tread of a crawler tractor or the like which is subjected to sudden loads and to lateral loads, said chain including a plurality of link pins, a bushing around each of said pins, said bushings being shorter than said pins with the pins extending beyond the ends of the bushings, a plurality of pairs of links, corresponding ends of each pair being attached to spaced portions of one of said bushings and functionally integral therewith, the opposite ends of each pair of said links being attached to spaced portions of one of said pins beyond its associated bushing and being functionally integral with said one pin, seals between the ends of each of said bushings and the latter ends of each pair of said links to prevent abrasive material from entering between the pins and the bushings, and a sleeve member between each of said pins and the associated bushing and rotatable with respect to each, said sleeve member extending substantially the length of the bushing.

2. A chain according to claim 1 characterized by each of said sleeve members forming a passage extending substantially the length of the associated bushing.

3. A chain according to claim 2 wherein said passage is helical.

4. A chain for the tread of a crawler tractor or the like which is subjected to sudden loads and to lateral loads, said chain comprising a pin, a bushing on said pin, said bushing being shorter than said pin with the pin extending beyond both ends of said bushing, a first link having an end functionally integral with a portion of said bushing, a second link having an end functionally integral with said pin beyond said bushing, a seal between said bushing and said second link, and a sleeve member between said pin and said bushing and extending substantially the length of said bushing, said sleeve member being rotatable with respect to both said pin and said bushing and forming a passage extending over substantially the length of said bushing.

5. A chain according to claim 4 wherein said passage is helical.

6. A chain according to claim 4 wherein said sleeve member constitutes a spring with the transverse cross section through each coil of the spring being of rectangular shape so as to bear against said pin during lateral movement and thereby resist lateral movement.

References Cited by the Examiner
UNITED STATES PATENTS

| | | | |
|---|---|---|---|
| 425,569 | 4/90 | Gare | 308—240 X |
| 797,641 | 8/05 | Thompson | 305—59 X |
| 1,186,721 | 6/16 | Wheat | 305—56 |
| 2,699,974 | 1/55 | Deffenbaugh | 305—58 X |
| 3,050,346 | 8/62 | Simpson et al. | 305—11 |
| 3,110,524 | 11/63 | Zeller et al. | 305—11 |

ARTHUR L. LA POINT, *Primary Examiner.*